United States Patent [19]
Lo et al.

[11] Patent Number: 5,727,242
[45] Date of Patent: Mar. 10, 1998

[54] SINGLE-LENS MULTIPLE APERTURE CAMERA FOR 3D PHOTOGRAPHIC/VIDEO APPLICATIONS

[75] Inventors: Allen Kwok Wah Lo, Dunwoody; Kenneth Quochuy Lao, Altanta, both of Ga.

[73] Assignee: Image Technology International, Inc., Norcross, Ga.

[21] Appl. No.: 667,303

[22] Filed: Jun. 20, 1996

Related U.S. Application Data

[63] Continuation of Ser. No. 239,525, May 9, 1994, abandoned.

[51] Int. Cl.$^6$ ............................................. G03B 35/00
[52] U.S. Cl. ............................................. 396/324; 352/86
[58] Field of Search ..................................... 396/324, 330, 396/331; 348/42, 49; 352/57, 58, 60, 62, 86; 359/462, 463, 478

[56] References Cited

U.S. PATENT DOCUMENTS

| | | | |
|---|---|---|---|
| 765,980 | 7/1904 | Mercier | 354/113 X |
| 3,240,138 | 3/1966 | Goddard | 354/112 X |
| 3,518,929 | 7/1970 | Glenn, Jr. | 354/113 |
| 3,674,339 | 7/1972 | Sayanagi | 359/462 |
| 3,960,563 | 6/1976 | Lo et al. | 354/114 X |
| 4,063,265 | 12/1977 | Lo et al. | 354/294 |
| 4,107,711 | 8/1978 | Law | 354/112 |
| 4,107,712 | 8/1978 | Law | 354/115 |
| 4,126,876 | 11/1978 | Jones | 354/112 |
| 4,166,684 | 9/1979 | Law | 354/203 |
| 4,475,798 | 10/1984 | Smith et al. | 354/114 |
| 4,568,160 | 2/1986 | Krueger | 352/86 |
| 4,800,407 | 1/1989 | Lo | 354/114 |
| 4,844,583 | 7/1989 | Lo | 359/464 |
| 5,160,962 | 11/1992 | Miura et al. | 355/53 |
| 5,192,969 | 3/1993 | Igarashi et al. | 355/22 |
| 5,302,988 | 4/1994 | Nanjo | 354/112 X |
| 5,349,403 | 9/1994 | Lo | 354/114 |
| 5,448,322 | 9/1995 | Bacs, Jr. | 396/324 |

*Primary Examiner*—Howard B. Blankenship

[57] ABSTRACT

A 3D camera for acquiring and recording a plurality of 2D images at different viewing angles without relocating the camera wherein a large-aperture taking lens is used for image forming and an aperture controlling means is used to select the section of the lens' aperture through which light rays are transmitted to form a 2D image at one viewing angle at a time. The 3D camera can also have a mirror assembly to direct light rays traversing different sections of the lens' aperture to form 2D images on different image planes.

7 Claims, 16 Drawing Sheets

SINGLE-LENS MULTIPLE APERTURE CAMERA FOR 3D PHOTOGRAPHIC/VIDEO APPLICATIONS

This is a continuation of application Ser. No. 08/239,525, filed May 9, 1994, now abandoned.

BACKGROUND OF THE INVENTION

1. Field of the Invention

The present invention relates generally to a photographic camera or video camera for acquiring images of the same scene at slightly different vantage points, and more specifically to a 3D camera which uses only one taking-lens to view a scene at a range of viewing angles.

2. Prior Art

In composing a 3D photographic print or presenting a video display that uses the parallax from the viewer's eyes to create a sense of depth of a scene, it is required that a plurality of two-dimensional (2D) views of the same scene be captured at a number of horizontally-spaced vantage points and that the 2D views be presented in a spatially or temporally multiplexed fashion such that the viewer's eyes see two images captured at two slightly different vantage points. When composing a 3D photograph or presenting a 3D display, it is essential that the 2D images be accurately aligned with reference to a certain point in the scene which is known as the key subject in 3D photography. The process of image alignment is usually referred to as the key-subject alignment. Furthermore, it is important to present an adequate amount of parallax in order to achieve a good sense of depth. Too little parallax will make a 3D scene look flat while too much parallax will make a 3D print or display become out of focus. Thus, in acquiring the 2D views at different viewing angles, it is essential to control the difference in the viewing angles in accordance with the scene settings.

In 3D photography, there are a number of approaches for capturing a plurality of 2D views of a scene at different vantage points and these approaches can be crudely classified into four categories: 1) multi-lens cameras such as those disclosed in U.S. Pat. No. 3,960,563 (Lo et al.), U.S. Pat. No. 4,475,798 (Smith et al.), U.S. Pat. No. 4,800,407 (Wah Lo) and illustrated in FIG. 1. 2) split-image cameras such as those with a prism assembly as disclosed in U.S. Pat. No. 3,674,339 (Sayanagi et al.) and those with a mirror assembly as illustrated in FIG. 2; 3) single-lens camera on a tracking device such as those disclosed in U.S. Pat. No. 765,980 (Mercier) and U.S. Pat. No. 4,063,265 (Lo et al.); and 4) camera assembly such as those disclosed in U.S. Pat. No. 3,518,929 (Glenn). Unfortunately, there are many disadvantages associated with each of the aforementioned disclosures. In a multi-lens camera the taking lenses are usually not identical in focal length, resulting 2D images with different magnifications, and the spacings between adjacent lenses are usually not equal to each others, making key-subject alignment very difficult. In a split-image camera the same film plane must be shared by a plurality of 2D views, resulting an undesirable image format and size. When using a single-lens camera on a tracking device, the camera must be relocated to different vantage points. The camera assembly approach is not practical because it requires a plurality of cameras with identical optical characteristics and the images must be recorded on separate film strips.

U.S. Pat. No. 4,107,711 (Law1) and U.S. Pat. No. 4,166,684 (Law2) disclose a method of using different sections of a taking lens' aperture to expose 2D views at different viewing angles on different sections of the image area underlying the lenticules of a lenticular sheet. However, the methods disclosed in Law1 and Law2 requires that the lenticular screen be separable from the image forming sheet and that the lenticular screen be shifted relative to image forming sheet during exposure. U.S Pat. No. 1,882,424 (Ives) discloses a method in which 2D views at a range of viewing angles are directly exposed on the lenticulated print material without shifting the lenticular screen or the image forming sheet. Unfortunately the 3D image formed on the print material by this method is pseudoscopic. U.S. Pat. No. 2,573,242 (Bonnet) and U.S. Pat. No. 4,126,876 (Jones) use Dove or Wollaston prisms and roof prisms to correct the pseudoscopic problem but the construction of such a camera is too complex to be practical. It should be noted that in the methods disclosed in Ives, Law1, Law2, Bonnet and Jones can only produce a stereograph directly on the print material and thus cannot record the 2D views separately on film or other media so that the recorded images be used for composing one or more 3D images at a later time. In particular, the method disclosed by Law cannot be used on a lenticulated print material on which the photographic emulsion is directly coated on the back side of the lenticular screen.

SUMMARY OF THE INVENTION

The objective of the present invention is to acquire a plurality of 2D views, with identical magnification, of a scene at different vantage points without relocating the entire camera to different locations. This objective can be achieved by the method and apparatus according to the present invention wherein a single taking lens with a larger aperture is used to cover all the viewing angles of the 2D views of a scene, together with an aperture control assembly which partitions the lens aperture into a plurality of horizontal sections and permits light rays traversing one section of the lens aperture at a time to form a 2D image on the image plane. In order that the lens aperture is sufficiently large to produce adequate parallax on the 3D photograph or display views of a single scene, the F-number of the lens can be ranging from 0.8 to 3.0 but it is preferred that the F-number is between 1.0 and 2.0. The 2D images formed on the image plane can be separately and sequentially recorded on photographic film or on one or more electronic imaging devices and then stored in an electronic storage medium so that the recorded 2D images may be used in real-time or at a later time for composing a 3D photograph on a lenticular print material or a parallax-barrier material; or composing a 3D display on a video monitor screen or a projection screen.

Another objective to the present invention is to provide a method and apparatus for simultaneously or sequentially recording each of a plurality of 2D images formed by a single taking lens separately on an entire and identical image frame on the image plane of the taking lens. This objective can be achieved by using a mirror assembly and an aperture control assembly to direct light rays traversing different sections of the lens aperture to form 2D images of different viewing angles on different image frames. Unlike a split-camera in which a plurality of 2D images must share the same image frame, the 3D camera according to the present invention records each of a plurality of 2D images on an entire image frame.

A further objective of the present invention is to provide a method and apparatus for recording a plurality of 2D views of a scene at different vantage points wherein the image locations of the key subject in all 2D views in relation to the optical axis of the taking lens on the image plane are substantially the same. This objective can be achieved by properly focusing the taking lens on the key subject in the scene. It is preferred that the 3D camera according to the present invention be equipped with an auto-focusing means so that the camera can be focused automatically or manually if so desired.

It is another further objective of the present invention to provide a method and apparatus for recording a plurality of 2D views of a scene at different vantage points wherein the parallax in adjacent 2D views is adjustable. This objective can be achieved by selecting or adjusting the spacing between the aperture sections used for taking adjacent 2D views.

It is yet another objective of the present invention to provide a method and apparatus for recording a plurality of 2D views of a scene at different vantage points with a single taking lens and an aperture control assembly wherein the taking lens' field of view can be varied. This objective can be achieved by using a zoom lens as the taking lens or using a lens attachment over a fixed-focus taking lens to alter the lens focal length without changing the location of the image plane.

BRIEF DESCRIPTION OF THE DRAWINGS

In FIG. 1, reference numerals 1, 2, and 3 denote three taking lenses which are horizontally spaced so that three 2D views of the same scene at different viewing angles can be simultaneously acquired and recorded on film. Numeral 6 denote a film mask which is used to define the boundary of image frames 21, 22, 23 on film 7 behind the corresponding lenses. The optical axes of the three taking lenses are represented by broken lines 301, 302, 303 through the corresponding lens' centers. Letter P denotes a point object which is not located at an infinitely large distance in the scene. As shown, images P1, P2, P3 of point P formed on the three image frames are located differently in relation to the corresponding optical axes regardless of where the lens is focused on.

In FIG. 2, reference numerals 4 and 5 denote a taking lens and an aperture plate with an opening; numerals 30, 31, 32, 33 denote mirrors on a stereoscopic attachment which forms two separate images on frames 41, 42 on film 9 behind a film mask 8. Images on frames 41 and 42 are 2D views of the same scene at different viewing angles. Letter Q denotes a point object in the scene. As shown, through the same taking lens 4, two images Q1 and Q2 of point Q are formed separately on 2D images 41 and 42. This type of stereoscopic attachment alters the field of view of taking lens 4. In particular, the stereoscopic attachment shown in FIG. 2 splits the image frame into two parts to accommodate two 2D views of the same scene and thus reduces the field of view of the taking lens to about 50%.

DETAILED DESCRIPTION OF THE PREFERRED EMBODIMENTS

Figure 1:
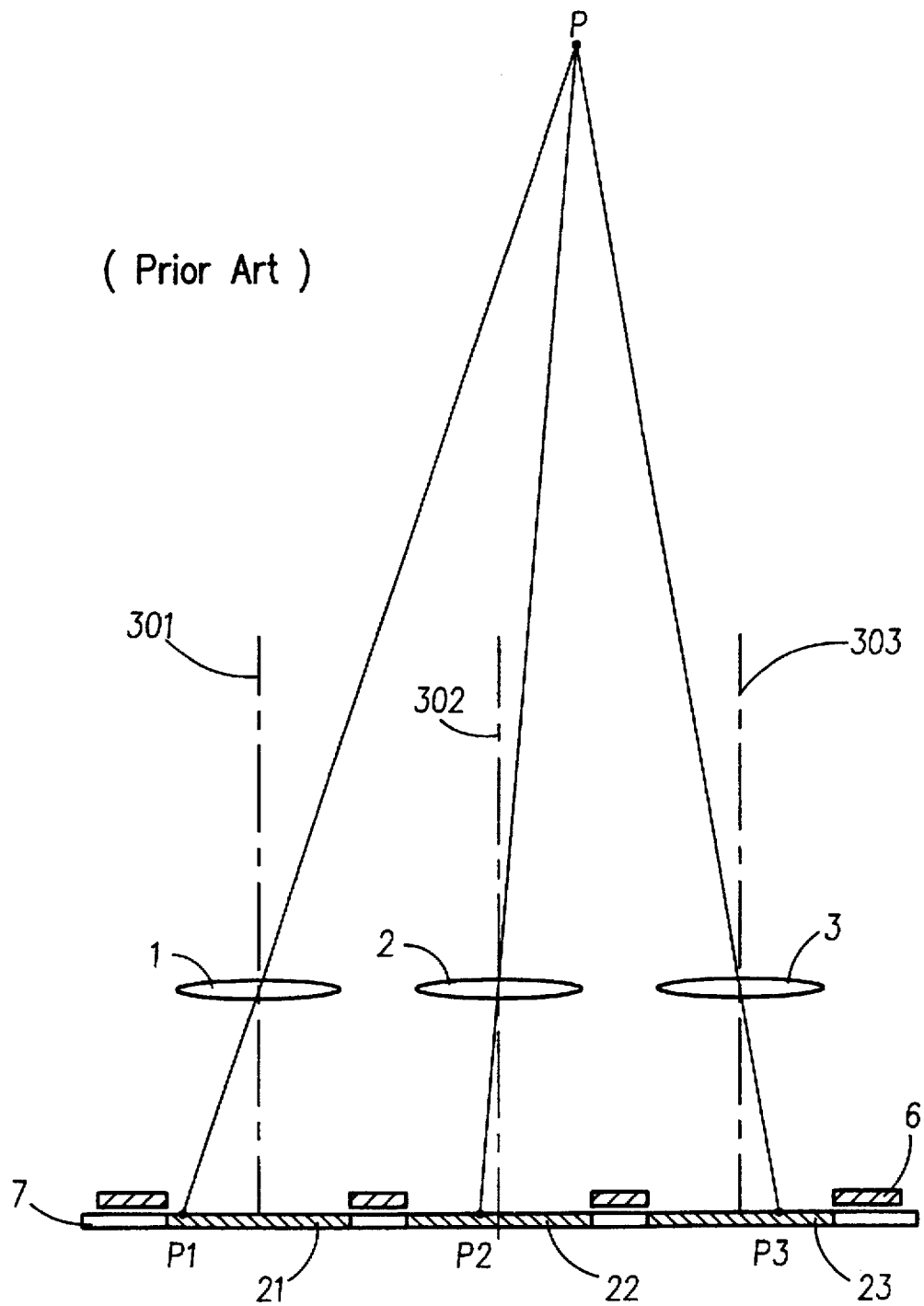
FIG. 1 is a schematic illustration of a prior art three-lens camera.
Figure 2:
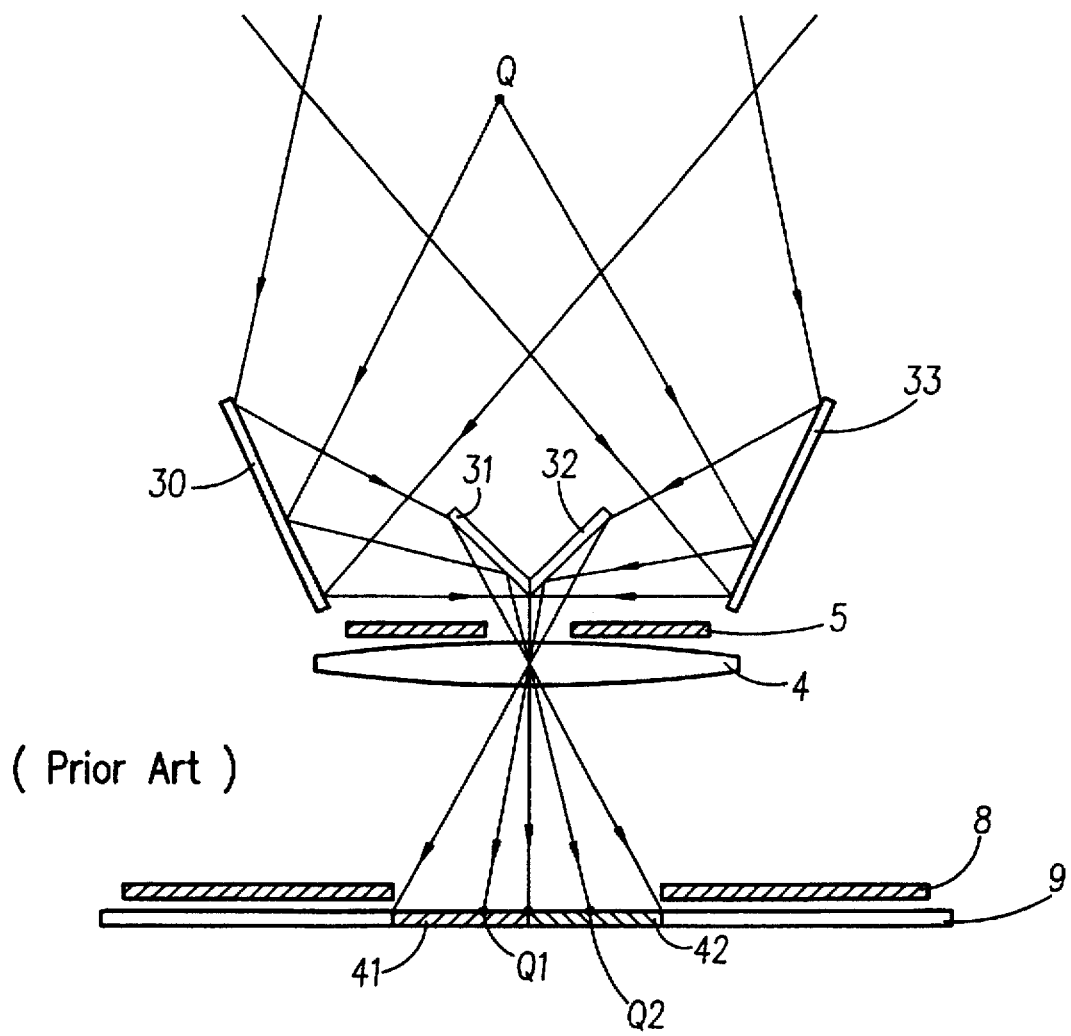
FIG. 2 is a schematic illustration of a prior art split-image camera using a mirror-type stereoscopic attachment.
Figure 3:
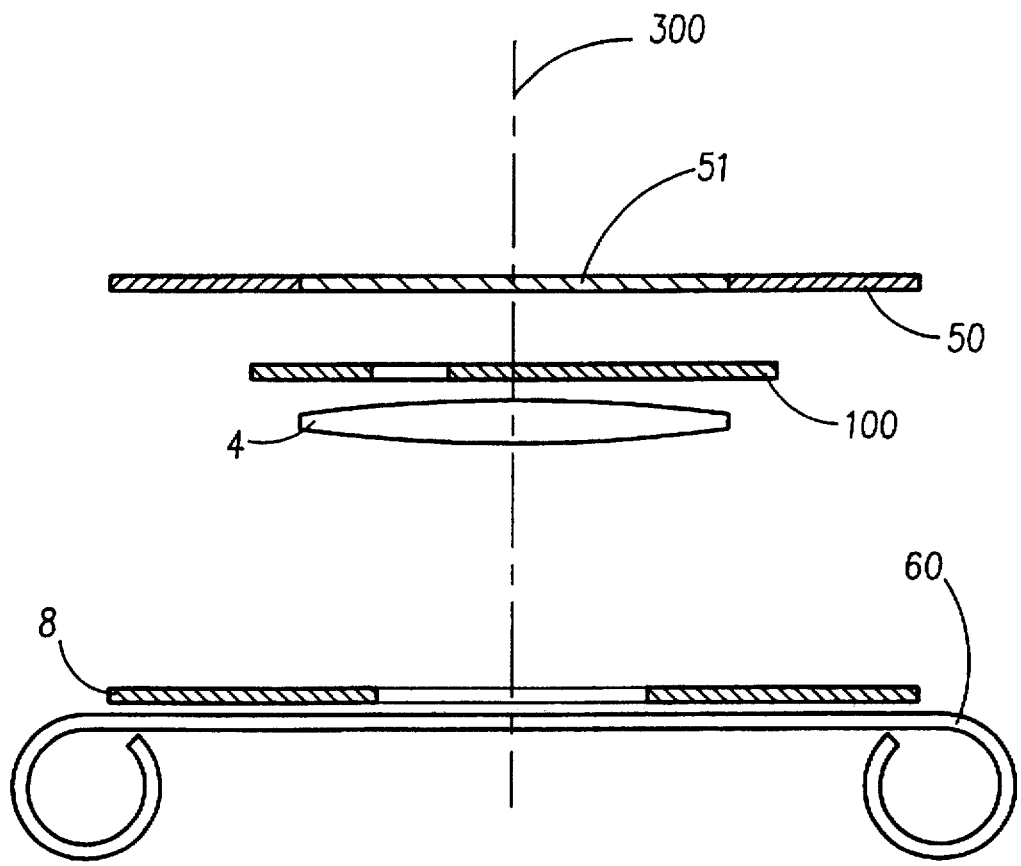
FIG. 3 is a schematic illustration of a first preferred embodiment of the 3D camera according to the present invention, showing a shutter, an aperture control assembly, a taking lens, a film mask and a photographic film.

In a first preferred embodiment of the present invention the single-lens 3D camera is an optical camera which records images on a roll or strip of photographic film as shown in FIG. 3. The camera comprises a taking lens 4, a shutter 50, an aperture control assembly 100, a film mask 8 and an image plane where photographic film 60 is located to record a plurality of 2D views formed by the taking lens, one at a time. The camera is equipped with a film winding mechanism so that photographic film 60 can be advanced or retrieved if so desired. The optical axis of the taking lens 4 is denoted by numeral 300. The aperture of the taking lens 4 is sufficiently large to cover a range of viewing angles. It is preferred that the F-number of the taking lens is between 1.0 and 2.0 but the F-number may range from 0.8 to 3.0. The aperture control assembly 100 is used to partitions the lens aperture into a plurality of horizontal sections and selects the aperture sections such that only light rays traversing one section of the lens aperture are permitted to form one 2D image at a time behind film mask 8 on photographic film 60. The shutter 50 provides a wide range of shutter speed ranging from 1/500 second to 5 seconds together with T and B modes for exposure control. The shutter 50 and the aperture control assembly 100 can be placed, separately or in tandem, behind or in front of the taking lens 4 in different orders. The taking lens 4 can be an assembly of a primary lens and a secondary lens and in that case, the aperture control assembly 100 and the shutter 50 may each be placed in between the primary lens and the secondary lens. The camera may be equipped with an auto-focusing device so that the camera can be focused automatically if so desired. Furthermore, the taking lens may be a zoom lens or a fixed-focus lens with a lens attachment which performs a zoom function.

Figure 4A:
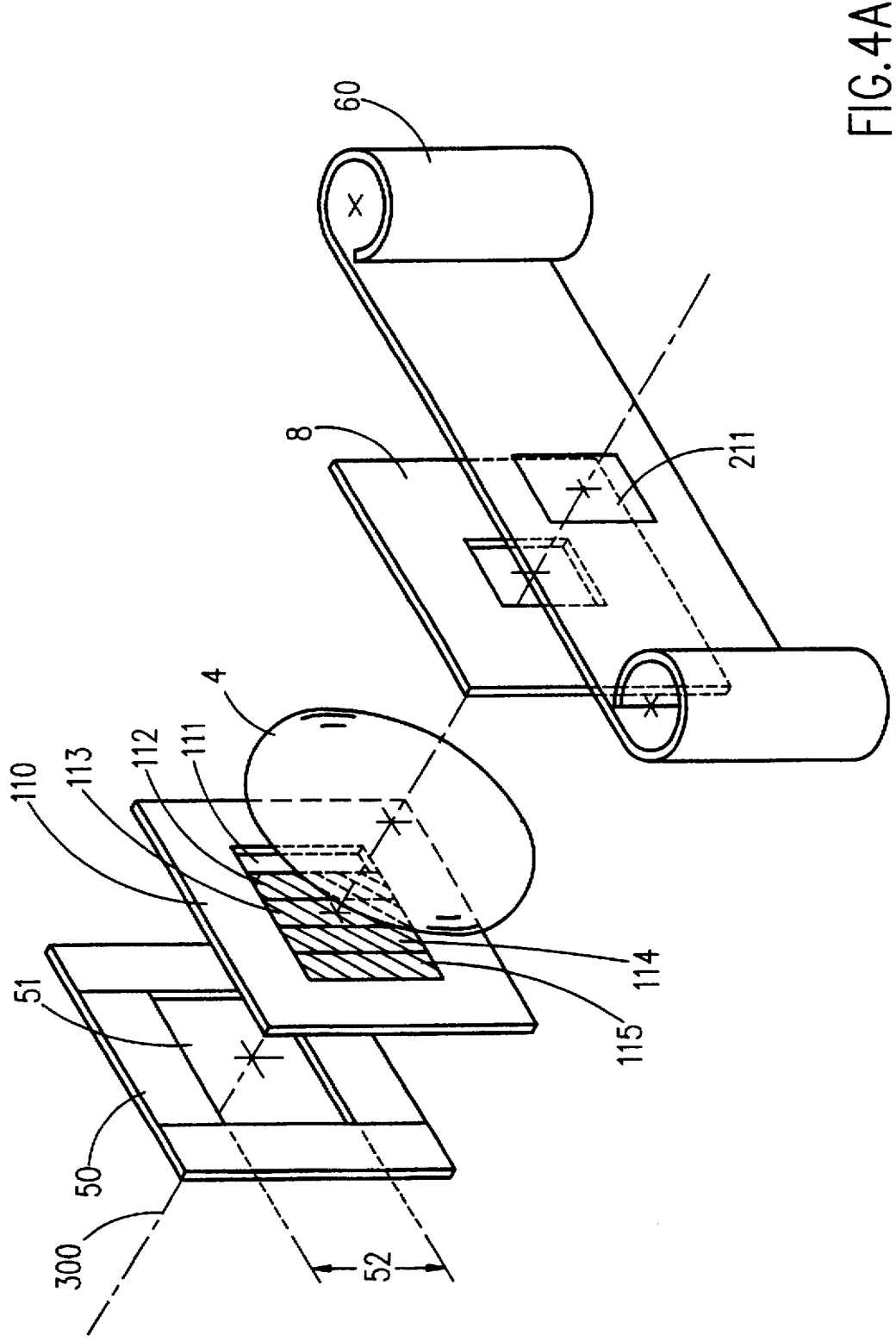
FIG. 4A to FIG. 4C are schematic, isometric representations of the 3D camera of FIG. 3 wherein the aperture control assembly is an aperture plate with 5 sections and a different section is opened for taking a 2D image of the same scene at a different viewing angle.
Figure 4B:
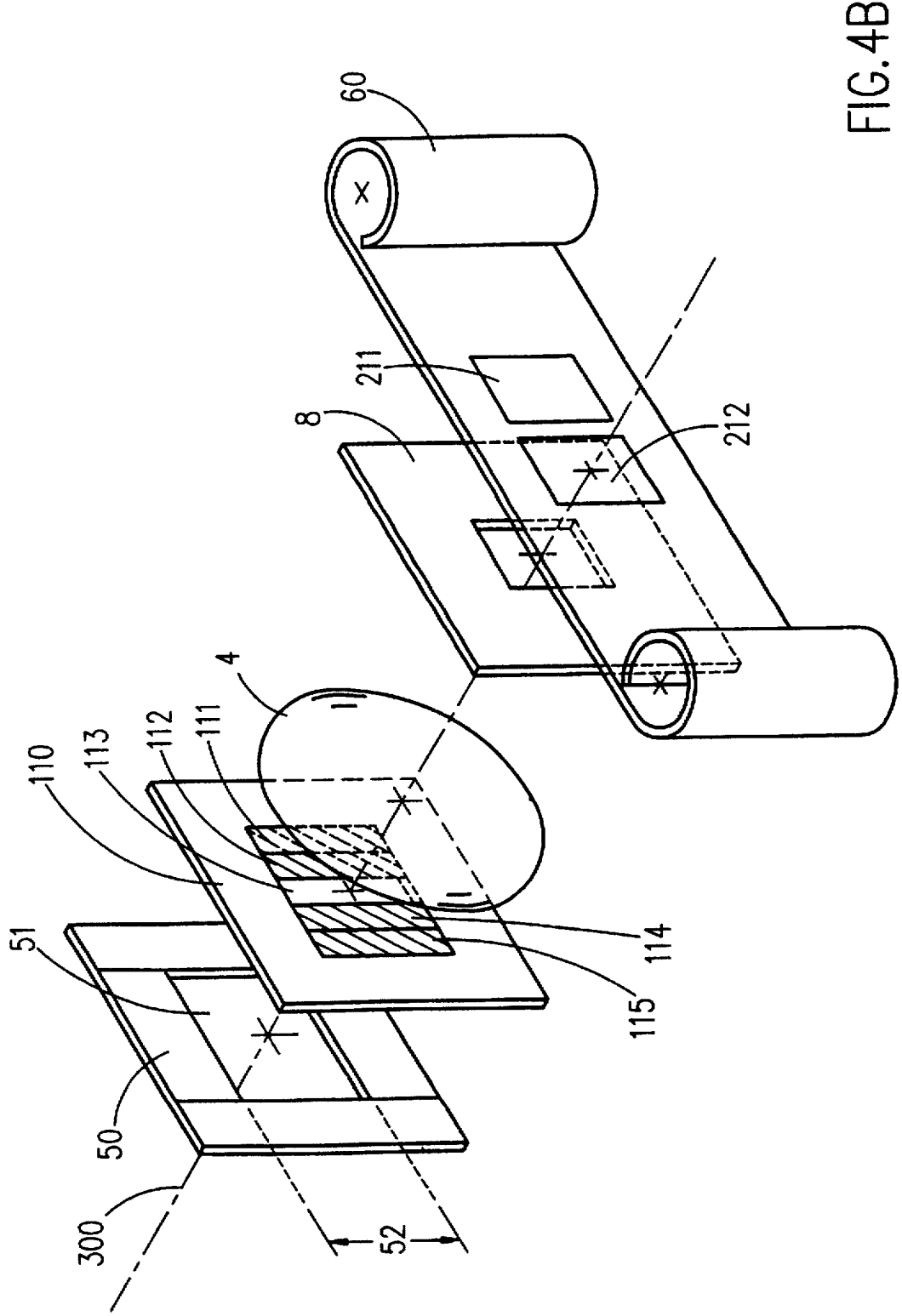
Figure 4C:
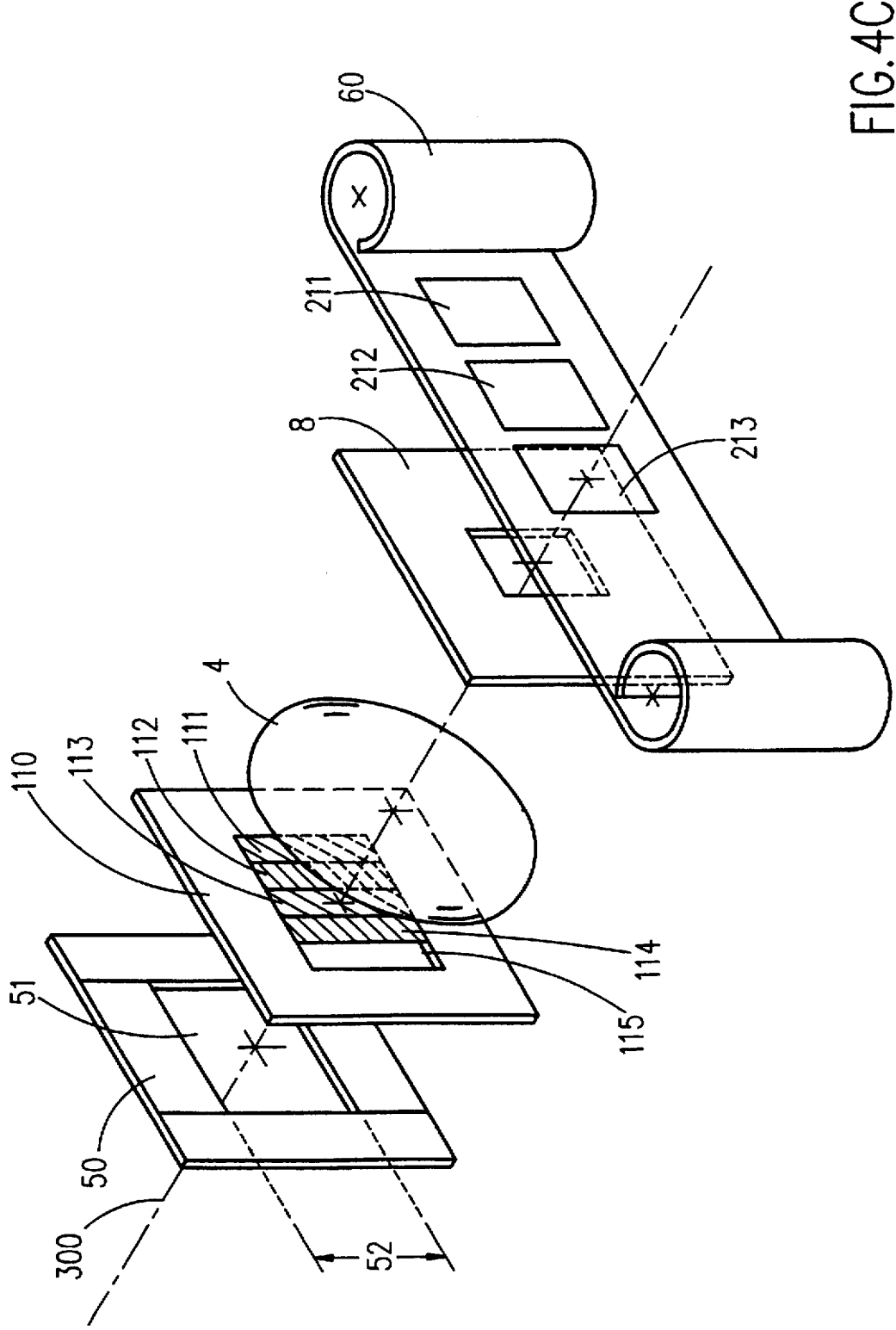

FIG. 4A to FIG. 4C are schematic, isometric representations of the camera of FIG. 3 wherein the aperture control assembly is an aperture plate 110 with a plurality of sections which cover, preferably, the full aperture of the taking lens 4. The number of sections on the aperture plate can be any number between 2 to 100. While the aperture plate 110 is fixedly located in the camera, different sections of the aperture plate may be opened, one at a time, to expose a desired number of 2D images of a single scene on separate image frames on film 60. The aperture sections are opened and closed by opening means. The aperture plate 110 can also be an electro-optic device such as a liquid crystal light valve which can be controlled electronically such that only one section of the aperture is opened at a time for exposure. For illustration purposes only, optical axis 300 of taking lens 4 is shown to intersect with various components of the camera and a cross sign is marked at each intersection. As shown in FIG. 4A to FIG. 4C, the shutter 50 has a shutter area 51 which is rectangular in shape with a vertical dimension 52. Shutter 50 may be constructed with moveable blades so that vertical dimension 52 can be increased or reduced for image sharpness control and exposure control by adjusting means. The shutter area 51 may be of a different shape such that the vertical dimension of the shutter area is smaller in the center and progressively greater on the sides.

For illustration purposes only, FIG. 4A shows an aperture plate having 5 sections 111 through 115, but only the rightmost section 111 is opened for exposure. The 2D image formed on the film strip 60 is represented by image frame 211.

FIG. 4B is the same as FIG. 4A except that the middle section 113 of the aperture plate 110 is opened for exposure. The 2D image formed on the film strip 60 is represented by image frame 212. As shown, film strip 60 has been advanced by a proper distance between exposures so that image frame 212 and image frame 211 are adequately separated.

FIG. 4C is the same as FIG. 4A except that the leftmost section 115 of the aperture plate 110 is opened for exposure. The 2D image formed on the film strip 60 is represented by image frame 213.

Figure 5A:
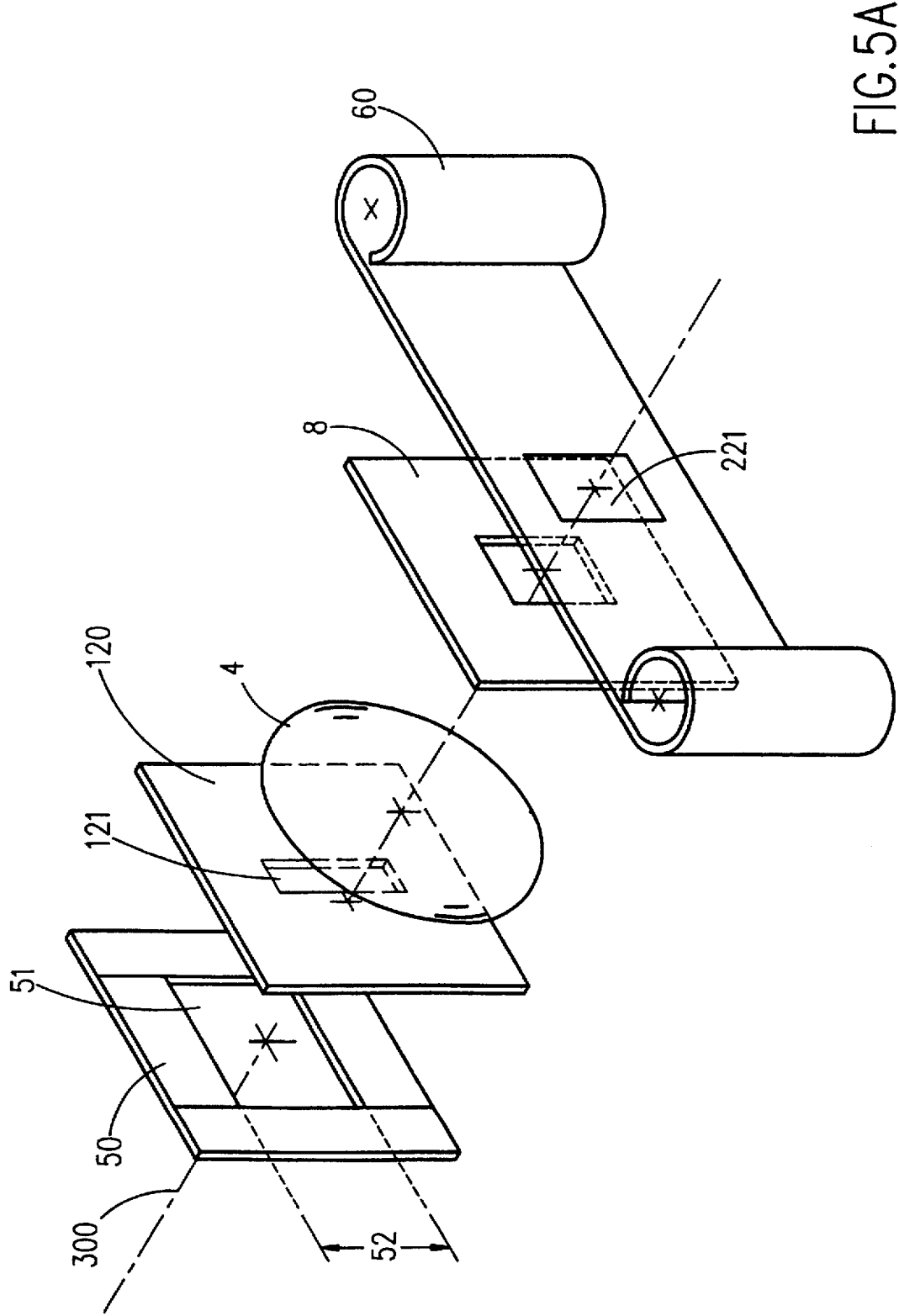
FIG. 5A to FIG. 5C are schematic, isometric representation of the 3D camera of FIG. 3 wherein the aperture control assembly is an aperture plate with a single opening and the aperture is moved by a driving mechanism to a different position to taking a 2D image of the same scene at a different viewing angle.
Figure 5B:
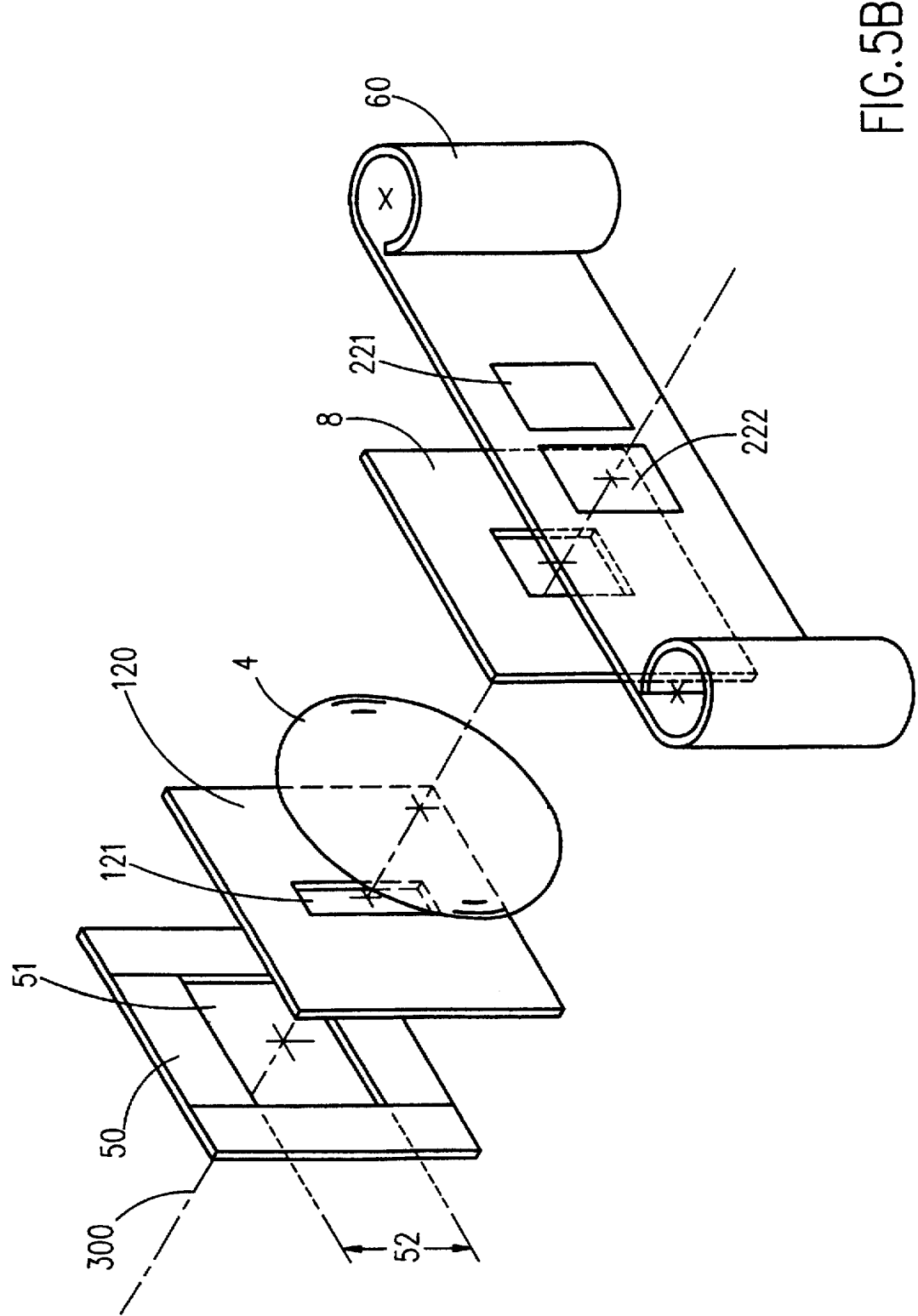
Figure 5C:
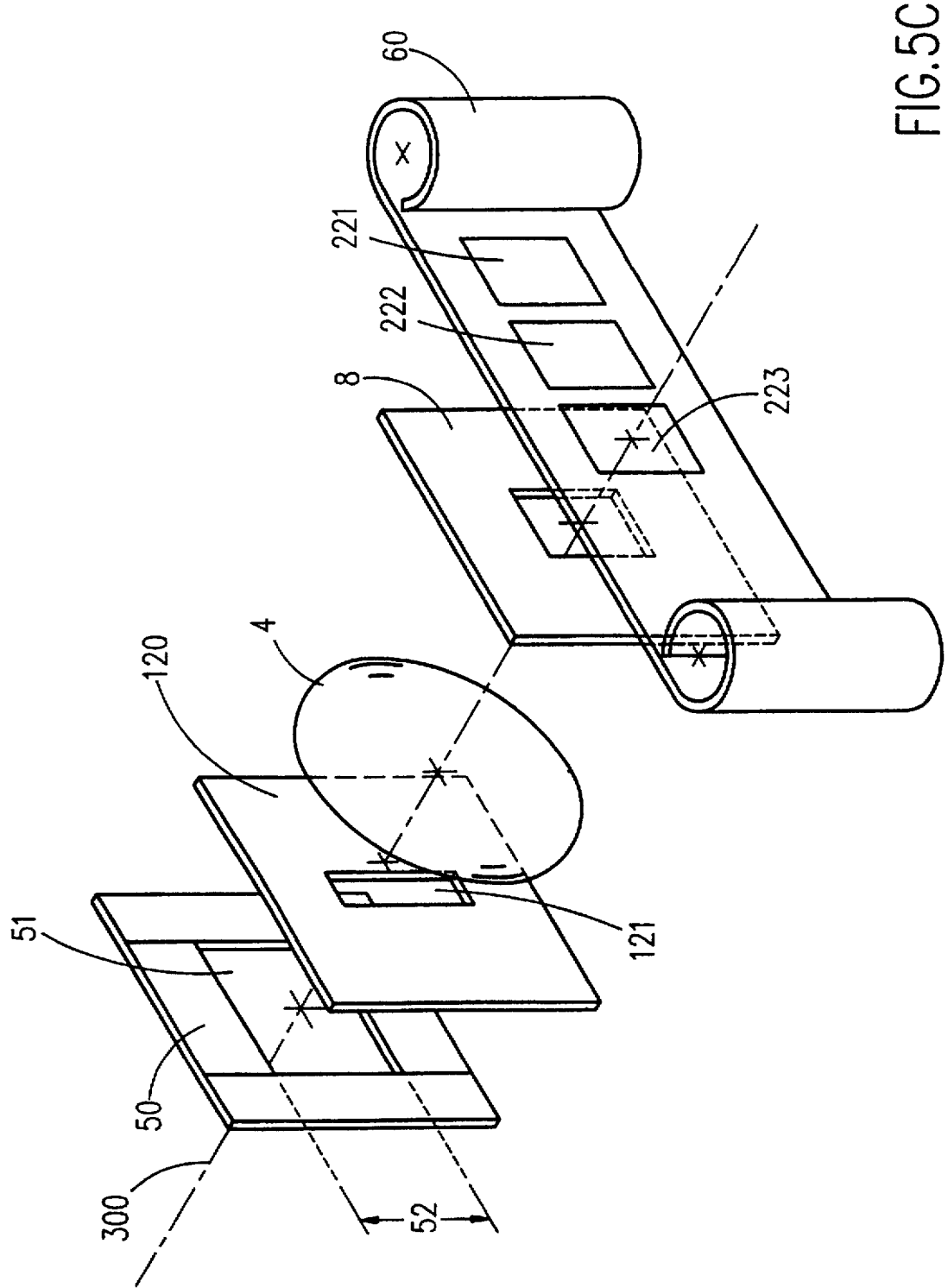

FIG. 5A to FIG. 5C illustrates a modified form of the camera of FIG. 3 wherein the aperture control assembly is an aperture plate 120 with a single opening 121. The width of the opening is equal to 1/N of the full aperture of taking lens 4 where N can be any integer or non-integer between 2 and 100. The aperture plate 120 is moved horizontally by driving means to a different position between exposures to select an aperture section of the taking lens. The moving distance of the aperture plate 120 between exposures can be smaller, equal or larger than the width of the opening 121. Moreover, the number of 2D images of scene taken at different viewing angles can be smaller, equal, or larger than N. For illustration purposes only, FIG. 5A shows an aperture plate having a single opening with its width being about ¼ of the full aperture of the taking lens 4. As shown, the opening is positioned to the right of the optical axis 300 of taking lens 4. The 2D image frame formed on film 60 at this aperture plate position is denoted by numeral 221. FIG. 5B is the same as FIG. 5A except that the aperture plate 120 has been moved to another position so that the optical axis 300 passes through the opening 121. Film 60 has been advanced so that the image formed at this aperture position on image frame 222 is adequately separated from image frame 221. FIG. 5C is the same as FIG. 5A except that the aperture plate 120 has been moved so that the opening 121 is on the left of the optical axis 300. Film 60 has also been advanced so that the image formed on frame 223 is adequately separated from other image frames.

Figure 6:
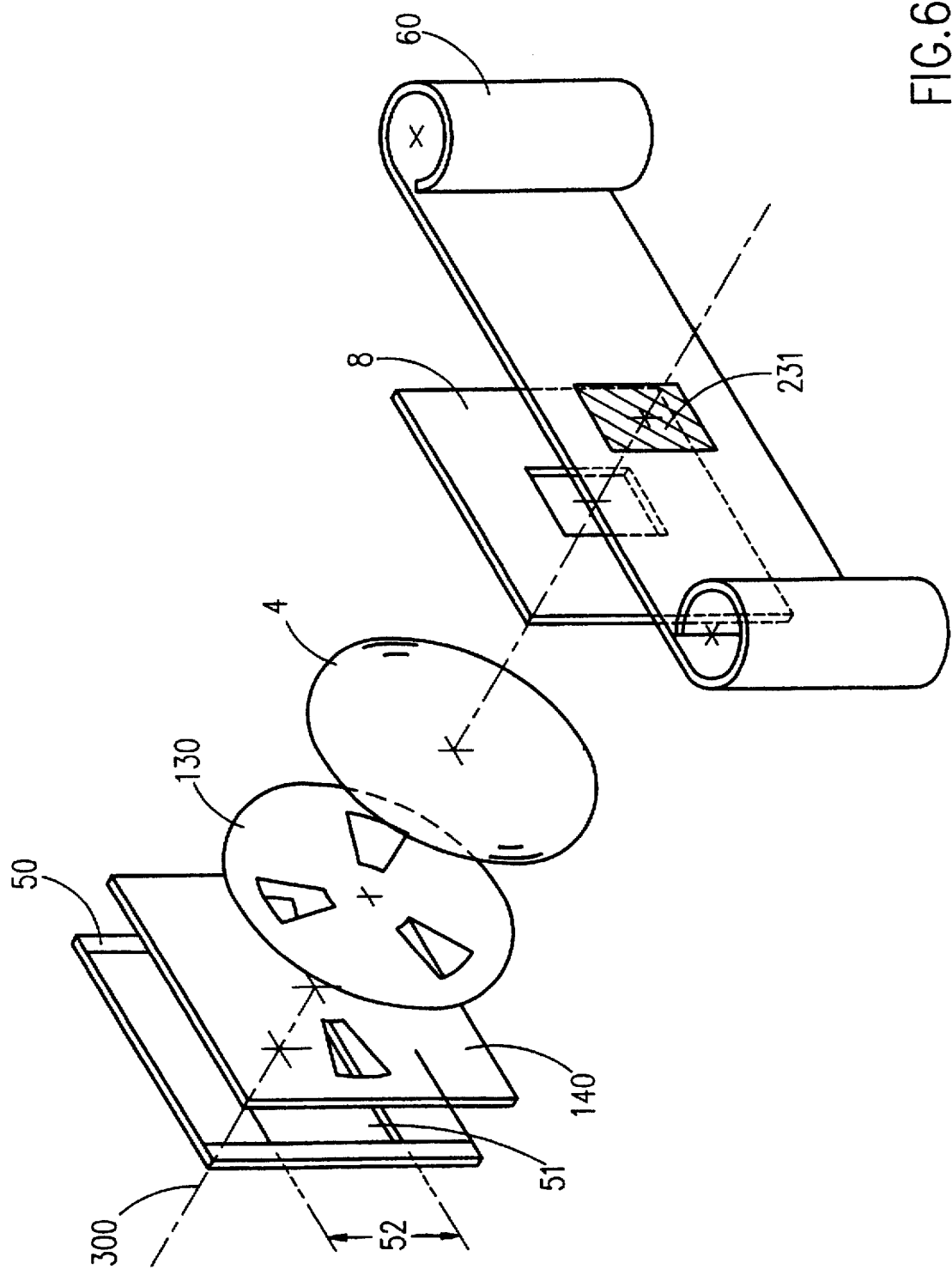
FIG. 6 is a schematic illustration of a modified form of the 3D camera of FIG. 3 wherein the aperture control assembly comprises a rotary disk and a matched window plate.
Figure 7A:
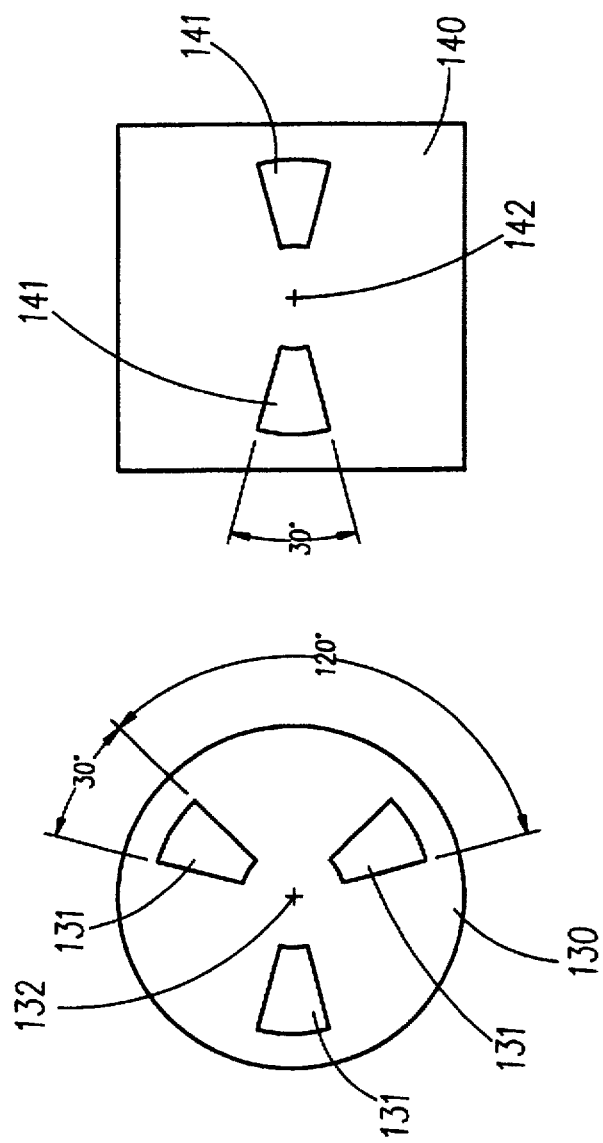
FIG. 7A is a schematic illustration of part of the camera of FIG. 6 showing a rotary disk and a matched window plate wherein the rotating axis of the rotary disk may substantially coincide with the optical axis of the taking lens.

FIG. 6 is a schematic, isometric representation of a modified form of the 3D camera of FIG. 3 wherein the aperture control assembly is a rotary aperture assembly comprising a rotary disk 130 and a matched window plate 140. The details of the rotary disk and the window plate are shown in FIG. 7A. For illustration purposes only, FIG. 7A show a rotary disk 130 having three substantially identical openings which are equally distributed around the disk's circle so that the angular distance between two openings is substantially equal to 120 degrees. These openings are collectively denoted by numeral 131. It is preferred that the window plate 140 has two matched openings which are located along the horizontal axis of the camera and the window plate is fixedly located in the camera. The opening on the window plate are collectively denoted by numeral 141. With this rotary aperture layout, only two viewing angles, namely, left and right, can be selected. It is preferred that at any time, only light rays from one lens aperture section can be transmitted to form an image on film. As shown in FIG. 7A each of the openings on the rotary disk and the window plate is a wedge shape with an angular width of 30 degrees or less so that when one of the disk's openings 131 scans across one of the window plate's openings 141, only light rays from one viewing angle can be transmitted. With this layout, the disk is rotated about its center 132 which is substantially aligned with the optical axis 300 of the taking lens 4 of the camera shown in FIG. 6. The openings on the rotary disk and those on the window plate may be of the same shape or of different shapes. Furthermore, the openings on either or both plates can be wider or narrower than 30 degree and the number of openings on the rotary disk can be any number between 3 and 100 depending on the width of the openings.

Figure 7B:
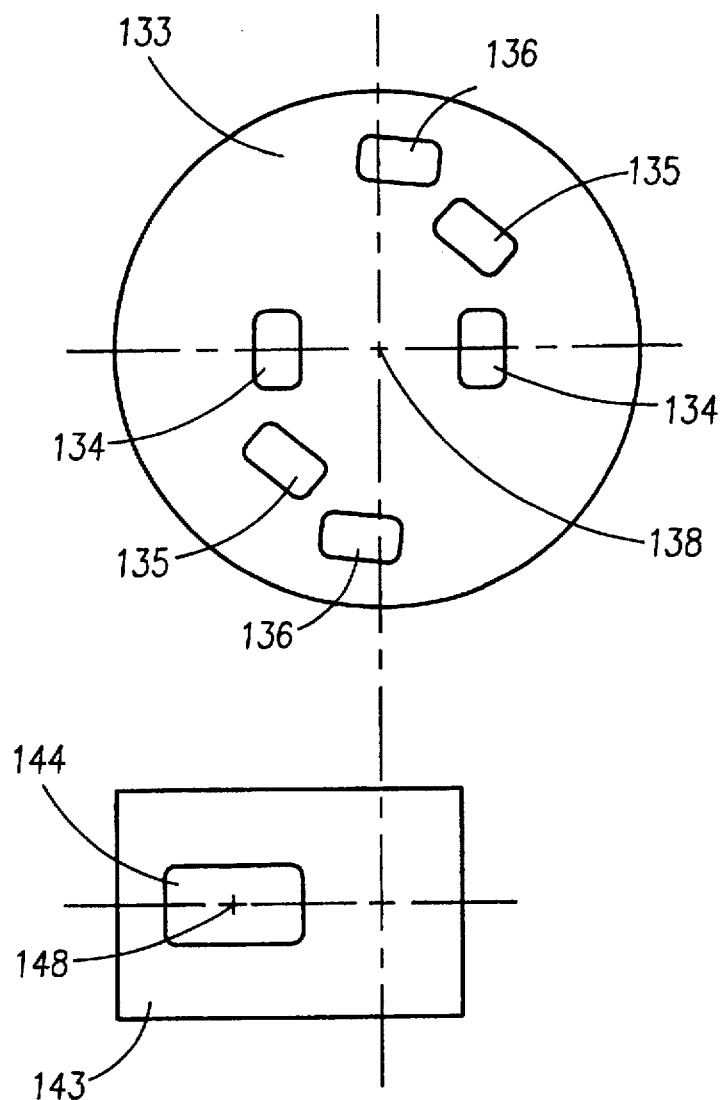
FIG. 7B is a schematic illustration of another example of the rotary disk and a matched window plate wherein the rotating axis of the rotary disk may not coincide with the optical axis of the taking lens.

FIG. 7B shows a variation in the layout of the rotary aperture assembly of FIG. 6. In FIG. 7B, the rotary disk 133 has two groups of three openings 134, 135, 136 and a matched window plate 143 has one opening 144. It is preferred that the opening 144 is sufficiently wide to cover the full aperture of the taking lens. With this layout, the rotary disk is rotated about its center 138 which is located off the side of the optical axis 300 of taking lens 4 of the camera as shown in FIG. 6 while the center 148 of the opening 144 is substantially aligned with the optical axis of the taking lens. The viewing angle of the taking lens can be selected by permitting light rays to traverse one of the disk's openings through the window plate's opening. The number of groups of openings on the rotary disk can be any number between 1 and 10, and the number of openings in each group on the rotary disk can be any number between 2 and 50. The window plate can have any number of openings ranging from 1 to 50, horizontally spaced to partition the lens' aperture. The openings on the rotary disk and those on the window plate can be of the same shape, the same size, or of different shapes and sizes.

Figure 8:
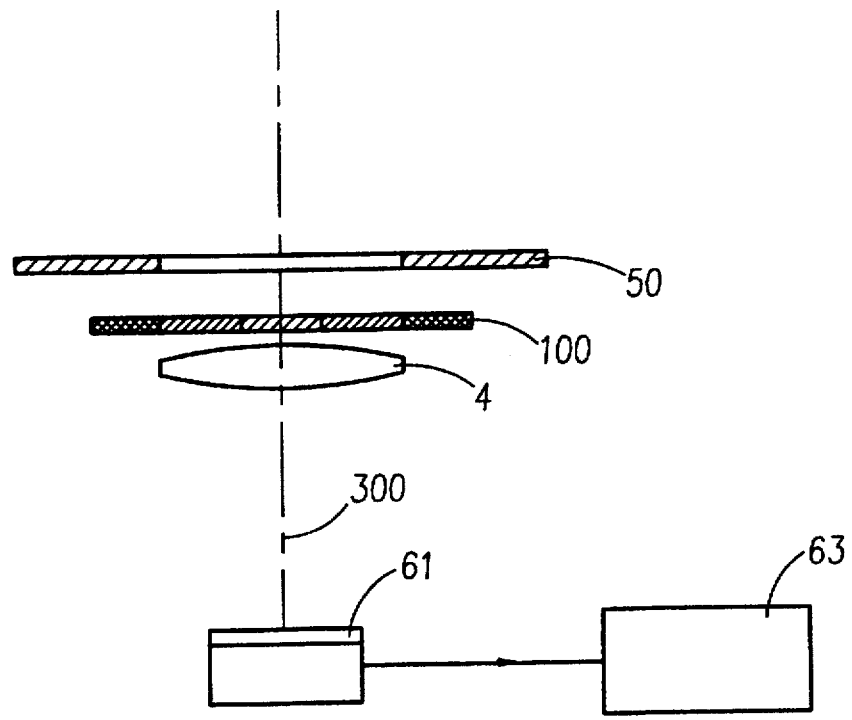
FIG. 8 is a schematic illustration of another modified form of the 3D camera of FIG. 3 wherein an electronic imaging device and an electronic storage device are used to replace the film mask and the photographic film for recording the 2D images.

FIG. 8 is a schematic illustration of a modified form of the 3D camera of FIG. 3 wherein the image forming and recording medium are different. Unlike the camera of FIG. 3 wherein the 2D images are formed behind film mask 8 on photographic film 60 which is advanced by film winding means between exposures, the camera of FIG. 8 uses a fixedly-located electronic imaging device 61 such as a CCD sensor array or a video tube to sequentially acquire 2D images, with or without a masking plate, and transfers these images to an electronic storage medium 63 such as a video tape, a computer hard disk, a floppy disk, a magnetic card or a photo-CD for storage. The stored images can be electronically retrieved to be displayed on a video monitor or a projection screen, or to be edited on an image processing device such as a computer. The stored images may also be used for composing 3D images on lenticulated print material or parallax-barrier type material.

Figure 9:
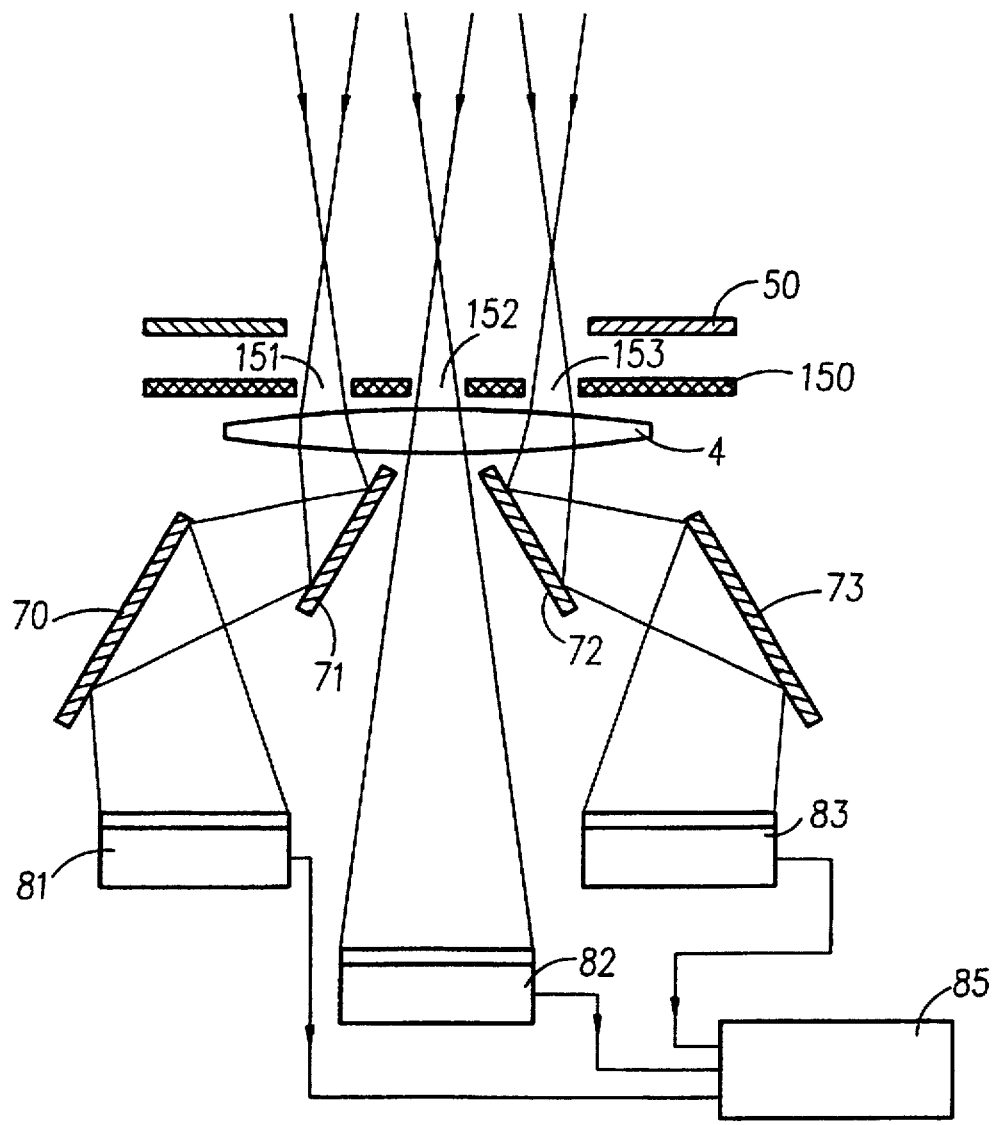
FIG. 9 is a schematic illustration of a second preferred embodiment of the 3D camera according to the present invention, showing a shutter, an aperture control assembly, a taking lens, an electronic image storage device, and a mirror assembly for directing light rays traversing different sections of the lens aperture to form a plurality of 2D images on separate electronic imaging devices.

FIG. 9 is a schematic illustration of a second preferred embodiment of the 3D camera according to the present invention. In FIG. 9, the camera comprises a taking lens 4, a shutter 50 as in the camera of FIG. 3. However, the camera of this second preferred embodiment uses an aperture plate which has a plurality of openings which are opened simultaneously so that a plurality of 2D views at different viewing angles can be acquired simultaneously by a number of electronic imaging devices. For illustration purposes only, FIG. 9 shows an aperture plate 150 with three openings 151, 152 and 153 so that images at three viewing angles can be acquired simultaneously through a mirror assembly which comprises two sets of mirrors to direct light rays traversing different sections of the lens aperture to different electronic imaging devices. As shown, light rays traversing opening 151 are directed by a set of mirrors 71, 70 so that the 2D image at this viewing angle is formed on electronic imaging device 81. Likewise, light rays traversing opening 153 are directed by a set of mirrors 72, 73 and the 2D image at this viewing angle is formed on an electronic imaging device 83. Light rays traversing opening 152 are directly focused to form a 2D image on electronic imaging device 82. It is preferred that imaging devices 81, 82 and 83 are identical. The image data from imaging devices 81, 82 and 83 are transferred to an electronic storage medium 85 to be stored. Electronic storage medium 85 can be a video tape, a computer hard disk, a floppy disk, a magnetic card or a photo-CD. The stored images can be retrieved to be displayed on a video monitor screen or a projection screen, or to be edited on an image processing device such as a computer. The stored images may also be used for composing 3D images on lenticulated print material or parallax-barrier type material. In FIG. 9, three 2D views may be simultaneously or sequentially acquired through three different sections of the lens aperture. However, the number of 2D views that can be acquired using mirrors and an aperture plate having multiple openings can be any number ranging from 2 to 20 and mirrors can move the image plane in different directions within the camera. It is preferred that the aperture plate 150 be made of moveable blades so that the width of each opening on the aperture plate can be vertically adjusted for sharpness control and that the position of each of openings 151 and 153 can be moved along the horizontal directions by adjusting means such that the spacing between openings on the aperture plate is adjustable for parallax control. The aperture plate 150 can be an electro-optic device such as a liquid crystal light valve. It should be noted that in the camera according to this second preferred embodiment of the present invention, mirrors are used to optically move the image plane to different locations so that a plurality of 2D images at different viewing angles may be simultaneously or sequentially acquired by separate imaging devices. The image planes formed by the mirror assembly may or may not be parallel to each others. In the mirror assembly, each mirror set may comprise an even number of mirrors ranging from 2 to 20. It is also preferred that the camera uses an auto-focusing device so that the camera can be focused automatically if so desired.

Figure 10:
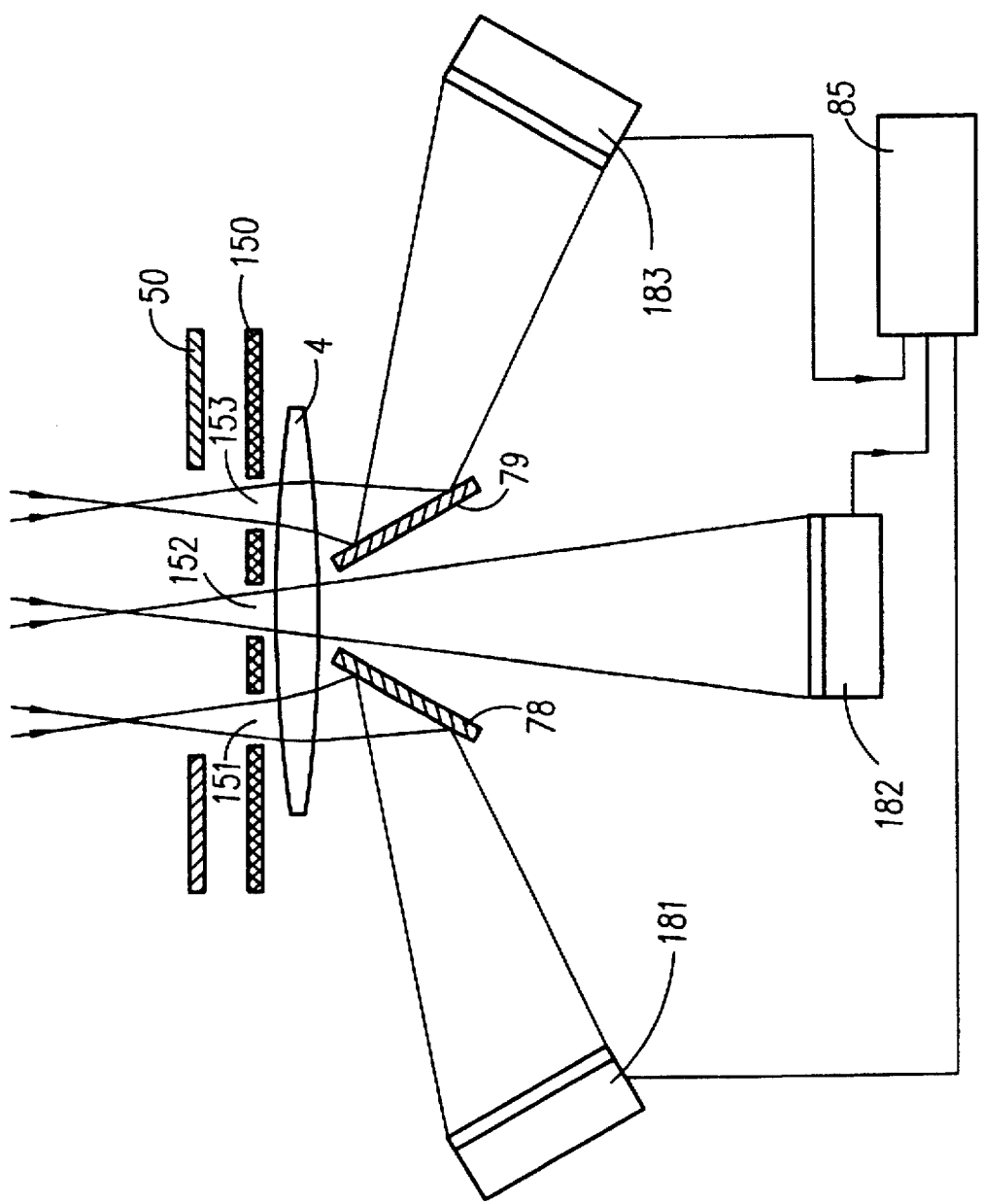
FIG. 10 is a schematic illustration of a modified form of the 3D camera of FIG. 9 wherein a different mirror assembly is used for directing light rays traversing different sections of the lens aperture to form a plurality of 2D images on separate electronic imaging devices.

FIG. 10 is a schematic representation of a modified form of the 3D camera of FIG. 9 wherein a different mirror assembly is used. The mirror assembly used in the camera of FIG. 10 comprises two mirror sets of which one set comprises mirror 78 and one set comprises mirror 79. In effect, mirror 78 replaces mirror set 70, 71 while mirror 79 replaces mirror set 72, 73. Each of the mirror sets in the mirror assembly may comprise an odd number of mirrors, ranging from 1 to 19. It should be noted that an image formed by an odd number of mirrors is a reversed image. Accordingly, the images acquired by electronic imaging devices 181 and 182 must be electronically reversed to become normal images before they are used to compose a 3D display while the image acquired by electronic imaging device 183 is a normal image.

Figure 11:
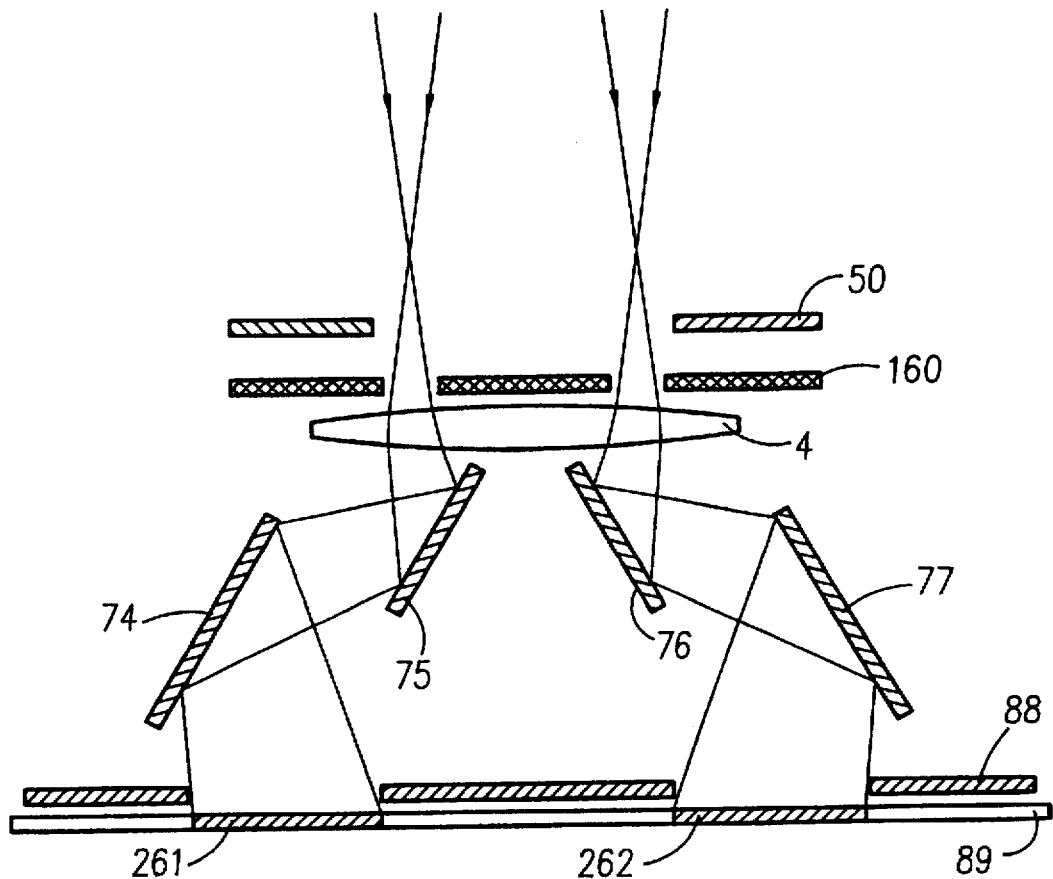
FIG. 11 is a schematic illustration of another modified form of the 3D camera of FIG. 9 wherein a mirror assembly is used for directing light rays traversing different sections of the lens aperture to form a plurality of 2D images on separate image frames on a photographic film.

FIG. 11 is a schematic illustration of another modified form of the 3D camera of FIG. 9 wherein the 2D images are recorded on a photographic film instead of electronic media. As shown in FIG. 11, numerals 50, 160, 4 denote a shutter, an aperture plate with a plurality of openings, and taking lens, respectively. A mirror assembly comprising two mirror sets of which one set comprises mirrors 74, 75 and one set comprises mirrors 76, 77 is used to direct light rays traversing different aperture sections of taking lens 4 to form separate 2D images on image frame 261, 262 on film 89 behind a film mask 88. Each mirror set may comprise any number of mirrors, ranging from 1 to 20. It is preferred that the film planes on image frame 261 and 262 are substantially parallel to each other, but the film planes may not be parallel to each others.

The above description sets forth the best mode of the invention as known to the inventors at this time, and the drawings are for illustrative purpose only, as it is obvious that one skilled in the art may make modifications to these embodiments without departing the spirit and scope of the invention and its equivalents as set forth in the appended claims.

What is claimed is:

1. A 3D camera for acquiring and recording a plurality of 2D images of a single scene at different viewing angles without relocating said camera, said camera comprising:

a taking lens;

aperture controlling means for partitioning the aperture of said lens into a plurality of horizontally spaced sections for permitting light rays to transmit through each of said aperture sections to provide a 2D image at a different viewing angle;

a plurality of mirror sets mounted behind said taking lens in registry with a plurality of said aperture sections for directing light rays transmitted through respective aperture sections to provide a plurality of 2D images taking at different viewing angles;

image recording means for recording 2D images taken by said taking lens; and a shutter for controlling transmission of light rays through said sections of said lens aperture.

2. The 3D camera according to claim 1 wherein said aperture controlling means comprises a fixedly mounted opaque plate having a plurality of horizontally spaced openings positioned in registry with said sections of said lens aperture respectively.

3. The 3D camera according to claim 1 wherein said image recording means comprises photographic film.

4. The 3D camera according to claim 1 wherein said image recording means comprises an electronic imaging device.

5. The 3D camera according to claim 4 further comprising image storing means for storing images conveyed from said electronic imaging device.

6. The 3D camera according to claim 2 wherein the spacing between said openings are adjustable for parallax control.

7. A 3D camera for acquiring and recording a plurality of 2D images of a single scene at different viewing angles without relocating said camera, said camera comprising:

a taking lens with the aperture of said lens being partitioned into a plurality of horizontally aligned sections through which light rays are transmitted to provide a plurality of 2D images at different viewing angles;

image recording means for recording 2D images formed by said taking lens;

a fixedly mounted window plate having an opening positioned in registry with a plurality of said sections of said lens aperture;

a rotary disk having a plurality of openings;

means for rotating said rotary disk to position one of said disk openings in registry with one of said sections of said lens aperture at a time so as to select said sections one at a time and to thereby eliminate unselected sections of said lens aperture from being used to provide images; and a shutter for controlling transmission of light rays through said sections of said lens aperture.

* * * * *